Patented Dec. 6, 1927.

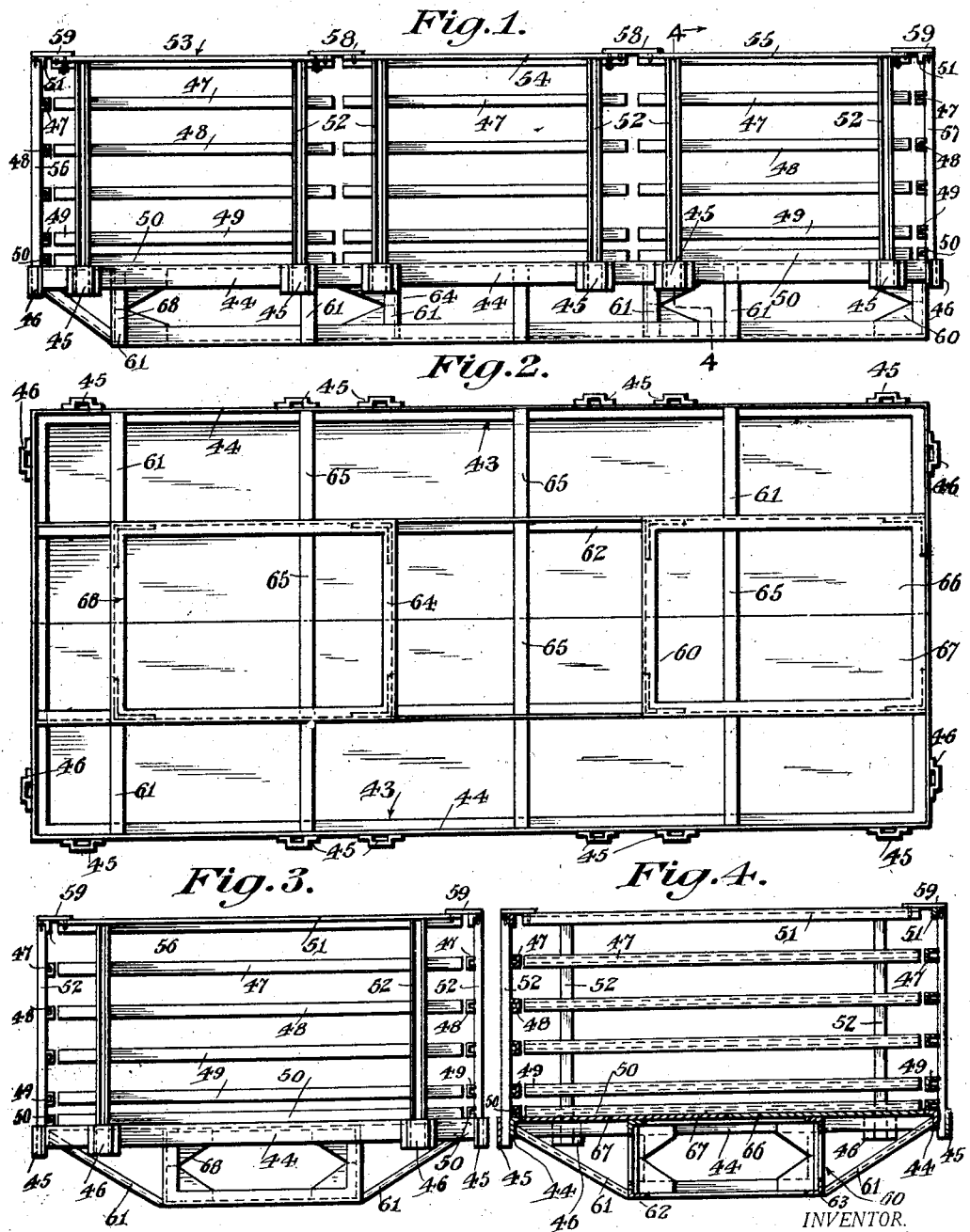

1,652,069

UNITED STATES PATENT OFFICE.

SIMEON E. TRAVIS, JR., OF HATTIESBURG, MISSISSIPPI.

SIDE-RAIL TRUCK BODY.

Original application filed March 17, 1926, Serial No. 95,332. Divided and this application filed September 10, 1926. Serial No. 134,722.

This invention relates to a truck body and is a division of the subject matter of my application filed March 17, 1926, Serial No. 95,332, and has for its object to provide, in a manner as hereinafter set forth, a truck body that can be easily loaded and unloaded and carry its load to the best advantage under all road conditions.

A further object of the invention is to provide, in a manner as hereinafter set forth, a truck body including removable side rails to permit of loading and unloading from either side thereof and further for retaining the load upon the bottom of the truck body.

A further object of the invention is to provide, in a manner as hereinafter set forth, a truck body provided with removable end rails whereby access can be had to the truck body from either end thereof.

Further objects of the invention are to provide, in a manner as hereinafter set forth, a truck body designed to be attached to any form of truck, which is simple in its construction and arrangement, strong, durable, compact, thoroughly efficient when used, readily installed with respect to a truck, of minimum weight, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of the truck body.

Figure 2 is a bottom plan view of the form of truck body shown in Figure 1.

Figure 3 is a view of the form of truck body shown in Figure 1.

Figure 4 is a section on line 4—4, Figure 1.

Referring to the drawings, the truck body comprises a rectangular frame 43 extending in the same plane throughout and formed of side and end members of angle shape to provide a vertically disposed leg 44 and an inwardly extending horizontally disposed leg which projects from the upper end of the leg 44. The ends of the side members are flush with the ends of the end members. The vertical leg 44 of each side of the frame is provided with a series of pairs of cleats 45 on the outer face thereof. The cleats of each pair are spaced from each other and each pair of cleats is spaced from an adjacent pair. The ends of the frame 43 has secured to the outer face of the vertical leg 44 thereof a pair of spaced cleats 46. The cleats 45 and 46 depend below the sides and ends of the leg 44.

The truck body includes a pair of sectional side rails and a pair of end rails and form respectively the sides and the ends of the truck body. As shown each side rail is formed of three sections but it is obvious that the number of the sections can be reduced or increased. Each side rail section, as well as an end rail is in the form of a frame and as each side rail section is of the same construction and further as the end rails are similar in construction to the side rails, but one will be described, as the description of one will apply to the other. It will be stated however that the end rails are of greater length than the side rail sections, otherwise they are of the same construction. Each side rail section and an end rail consists of a series of superposed spaced parallel bars 47, 48, 49 and 50 and a top bar 51 which is angle shaped in cross section to form a vertically disposed leg and a horizontally disposed leg and with the latter projecting outwardly from the upper end of the former. The bar 50 is arranged closer to the bar 49 than the distance between the other of said bars of the rail section or end rail. The bars 47 to 51 are secured together by vertically disposed spaced supports 52 in the form of channel irons and each of which depend below the bar 50. The upper ends of the supports 52 are secured to the outer face of the vertical leg of the bar 51 and abuts against the lower face of the horizontal leg of such bar.

The lower projecting ends of the vertical standards or supports 52 of a side rail section extend into a pair of cleats 45 and the lower projecting ends of the standards or supports 52 of the end rails section extend into a pair of cleats 46. When the side sections and end rails are mounted in vertical position, the bars 50 thereof seat on the horizontally disposed leg of the frame 43, see Figure 4.

The sections of each side rail are indicated generally by the reference characters 53, 54 and 55 and one end rail is indicated at 56 and the other at 57. The sections 53, 54 and 55 are arranged in opposed spaced relation with respect to each other and are further spaced from the end rails 56 and 57. The sections 53, 54 and 55 are detachably connected together by suitable latching devices as indicated at 58 and which can be of the form shown in Figure 1. In the form shown in Figure 1 the latching device consists of a flat short bar fixed to the top bar of a section 53 and which is provided with a pin extending through an opening formed in the top bar of the section 54 or the latching device can be reversed, that is to say fixed to the top bar of the section 54 and detachably engaging with the bar of the section 53. The arrangement of the latching device between the sections 54 and 55 can be such as referred to with respect to the sections 53 and 54. The end sections of each side rail are detachably connected to the end rails and for such purpose latching devices are arranged for detachably connecting said end sections to the end rails. As shown each latching device consists of an L-shaped bar 59 which is fixed to a side rail section and overlaps an end rail and is formed with a pin which detachably engages in the top bar of said end rail. The latching devices provide for detachably connecting the sections of each side rail together and furthermore for detachably connecting sections of each side rail to the end rails, and further it provides for detachably securing the end rails in position with respect to the side rails.

Positioned at the longitudinal median of the frame 43, as well as arranged below the latter is a sub-frame 60 consisting of a pair of longitudinally extending brace members 62 arranged in spaced relation and in parallelism and extending from the vertical portion of one end member of the frame 43 to the vertical portion of the other end member of the frame 43. Each of said brace members is of angle shape in cross section and has the horizontal portion thereof extended inwardly at right angles with respect to the upper end of the vertical portion thereof. The sub-frame 60 further includes a pair of spaced rectangular frames 64 which are secured to the bottoms of the vertical legs of the brace members 62. One of the frames 64 is flush with one end of the frame 43 and the other frame 64 is positioned adjacent the other end of the frame 43. Secured to the inner faces of the vertical portions of the side members of the frame 43 and to the bottoms of the sides of the frame 64 are inclined brace members 61.

Secured to the inner faces of the vertical portions of the side members of the frame 43 are transversely extending brace members 65 which extend through the vertical portions of the brace members 62. The brace members 65 are arranged in spaced relation.

Mounted on the horizontal portions of the brace members 62 and secured to the horizontal portions of the side and end members of the frame 43 is a bottom or floor and which is formed of two sections 66 and 67 arranged in abutting position. The rectangular frames 64 are provided with corner pieces 68 for bracing the ends thereof.

The various elements of the form of truck body shown in Figure 1 which are connected together in fixed relation relative to each other are secured by welding, but it is to be understood that the said elements can be secured together in any suitable manner.

The form of truck body shown in Figure 1 permits of loading from each side or from each end thereof and furthermore permits of an end rail being removed independent of the side rails when desired. Furthermore the side rails are so constructed that any section thereof can be removed without removing all the sections of the side rails.

It is thought the many advantages of a truck body, in accordance with this invention, can be readily understood and although the preferred embodiment of the invention is as illustrated and described, yet it is to be understood that changes in the details of construction can be had which will fall within the scope of the invention as claimed.

What I claim is:—

1. A truck body comprising a rectangularly shaped frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said end members and supporting said bottom, and spaced transversely extending brace members secured to the inner faces of the vertical portions of said side members and extending through the vertical portions of said longitudinal brace members.

2. A truck body comprising a rectangularly shape frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said end members and supporting said bottom, spaced transversely extending brace members secured to the inner faces of the vertical portions of said side members and extending through the vertical portions of said longitudinal brace members, and spaced cleats secured to the outer faces of the vertical portions of said side and end members for the reception of side and end rails and further depending below said vertical portions.

3. A truck body comprising a rectangularly shaped frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said end members and supporting said bottom, spaced transversely extending brace members secured to the inner faces of the vertical portions of said side members and extending through the vertical portions of said longitudinal brace members, and spaced frames of less width than the width of the first mentioned frame and secured to and depending from said longitudinal brace members.

4. A truck body comprising a rectangularly shaped frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said end members and supporting said bottom, spaced transversely extending brace members secured to the inner faces of the vertical portions of said side members and extending through the vertical portions of said longitudinal brace members, spaced frames of less width than the width of the first mentioned frame and secured to and depending from said longitudinal brace members, and inclined brace members between the inner faces of the vertical portions of the side members of the first mentioned frames and the sides of the spaced frames.

5. A truck body comprising a rectangularly shaped frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said end members and supporting said bottom, spaced transversely extending brace members secured to the inner faces of the vertical portions of said side members and extending through the vertical portions of said longitudinal brace members, spaced frames of less width than the width of the first mentioned frames and secured to and depending from said longitudinal brace members, and inclined brace members between the inner faces of the vertical portions of the side members of the first mentioned frames and the sides of the spaced frames, one of said spaced frames having its end positioned at one end of the first mentioned frame and the other spaced frame having its outer end positioned adjacent the other ends of the first mentioned frame.

6. A truck body comprising a rectangularly shaped frame extending in the same plane throughout and having its end and side members of angle shape in cross section to provide a vertically disposed portion and a horizontally disposed portion extending at right angles to the upper end of the vertical portion, the ends of said side members flush with the tops of said end members, a bottom secured to the horizontal portions of said side and end members, spaced longitudinally extending brace members secured to the inner faces of the vertical portions of said side members and extending through the vertical portions of said longitudinal brace members, spaced frames of less width than the width of the first mentioned frame and secured to and depending from said longitudinal brace members, and inclined brace members between the inner faces of the vertical portions of the side members of the first mentioned frame and the sides of the spaced frames, one of said spaced frames having its end positioned at one end of the first mentioned frame and the other spaced frame having its outer end positioned adjacent the other ends of the first mentioned frame, inclined brace members between the outer end of that spaced frame which is spaced adjacent an end of the first mentioned frame and said end of the latter.

In testimony whereof, I affix my signature hereto.

SIMEON E. TRAVIS, Jr.